(12) United States Patent
Tamura et al.

(10) Patent No.: US 7,649,822 B2
(45) Date of Patent: Jan. 19, 2010

(54) RECORDING AND REPRODUCING APPARATUS AND RECORDING METHOD

(75) Inventors: Tetsuya Tamura, Kanagawa (JP); Hajime Nishimura, Kanagawa (JP); Takeshi Sasa, Miyagi (JP); Kazuya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 10/574,243

(22) PCT Filed: Sep. 30, 2004

(86) PCT No.: PCT/JP2004/014806

§ 371 (c)(1),
(2), (4) Date: Dec. 4, 2006

(87) PCT Pub. No.: WO2005/034120

PCT Pub. Date: Apr. 14, 2005

(65) Prior Publication Data

US 2007/0104038 A1    May 10, 2007

(30) Foreign Application Priority Data

Oct. 2, 2003   (JP) .............................. 2003-345060

(51) Int. Cl.
*G11B 5/09* (2006.01)
(52) U.S. Cl. .................. 369/53.24; 369/53.2; 369/47.1; 369/59.14
(58) Field of Classification Search ........................ None
See application file for complete search history.

(56) References Cited

U.S. PATENT DOCUMENTS

| 5,822,288 | A  | * | 10/1998 | Shinada ................... 369/47.33 |
| 7,224,888 | B2 | * | 5/2007  | Kikuchi et al. ................. 386/95 |
| 7,266,061 | B2 | * | 9/2007  | Yoshida et al. ........... 369/47.14 |

FOREIGN PATENT DOCUMENTS

| JP | 7-210330   | 8/1995 |
| JP | 8-249129   | 9/1996 |
| JP | 11-232037  | 8/1999 |
| JP | 11-242563  | 9/1999 |
| JP | 2000-112669 | 4/2000 |
| JP | 2003-264765 | 9/2003 |

* cited by examiner

*Primary Examiner*—Muhammad N. Edun
(74) *Attorney, Agent, or Firm*—Robert J. Depke; Rockey, Depke & Lyons, LLC

(57) ABSTRACT

A recording/reproducing apparatus is provided which can write continuously a file of large-capacity at high-speed.

A record area of HDD is provided with a disk cache area for temporarily storing data to be written. The disk cache area is defined as a area that is not used by a host apparatus (3) in an LBA space, and the disk cache area is disposed in an area with a high transfer rate such as an outer circumferential area of a disk (10). A file transferred from the host apparatus (3) is written in the disk cache area, and the file is transferred from the disk cache area to a usual user area during an idle period to release the disk cache area and prepare for next transfer data write.

6 Claims, 4 Drawing Sheets

| bit | 7 | 6 | 5 | 4 | 3 | 2 | 1 | 0 |
|---|---|---|---|---|---|---|---|---|
| COMMAND | XXh ||||||||
| FEATURES | LOG | GOPT | OP | IP | EID | ID2 | ID1 | ID0 |
| SECTOR COUNT | START CLUSTER ADDRESS (7:0) ||||||||
| SECTOR NUMBER | START CLUSTER ADDRESS (15:8) ||||||||
| CYLINDER LOW | START CLUSTER ADDRESS (23:16) ||||||||
| CYLINDER HIGH | START CLUSTER ADDRESS (31:24) ||||||||
| DEVICE/HEAD | obs | Na | obs | DEV | na | MLT | QW | DMA |

Fig.4

RECORDING AND REPRODUCING APPARATUS AND RECORDING METHOD

This application is a 371 U.S. National Stage filing of PCT/JP2004/014806, filed Sep. 30, 2004, which claims priority to Japanese Patent Application No. JP2003-345060, filed Oct. 2, 2003, both of which are incorporated herein by reference.

TECHNICAL FIELD

The present invention relates to a recording/reproducing apparatus and a recording/reproducing method in which various data such as AV data is managed as files, and more particularly to a recording/reproducing apparatus and a recording method suitable when using as a recording medium a disk or the like having data transfer rates differed according to access positions of the disk.

BACKGROUND ART

A FAT file system is a file system used by external storage apparatus of PC, such as a hard disk drive (HDD) and media using a solid state memory as a recording medium (Memory Stick (registered trademark) manufactured by Sony Corporation, SmartMedia (registered trademark) manufactured by Toshiba Corporation, CompactFlash (registered trademark) manufactured by SanDisk Inc. and MultiMediaCard, etc.).

The FAT file system uses a FAT (File Allocation Table) indicating that each file is located at which position of a recording medium, and two data: a file attribute and a directory item indicating that each file exists at which position of the directory.

An area dedicated to a FAT and a root directory is usually provided in a recording medium. A PC (Personal Computer) receives these information necessary for file access information.

A memory for constantly storing a copy of the contents of a FAT area in a storage medium is provided in a recording/reproducing apparatus. As a host apparatus issues an access request command, FAT stored in the memory is referenced to determine an access position so that high-speed access is possible (for example, refer to Patent Document 1 (Japanese Patent Application Publication HEI-8-339661)).

If a spinning recording medium such as HDD is used, a transfer rate in an inner area is much slower than that in an outer area (about a half for HDD). Although the FAT file system writes data continuously by using an (outer) area having a fast transfer rate as much as possible, after the outer area is used completely, the inner area with a slow rate has to be used by all means. If data write and erase are executed repetitively, it becomes difficult to acquire a continuous empty area, and one file is recorded divisionally into a number of non-continues clusters so that a transfer rate is lowered greatly (this is generally called fragmentation).

In either case, the transfer performance lowers as the time elapses. Particularly, if continuous imaging is performed in a high image quality mode of a digital still camera, data write of large-capacity at high-speed occurs in a short time and it is difficult to process this data write by using a presently used recording medium such as HDD and memory card. There arise therefore problems such as loading a large buffer in a camera and prolonging a wait time for writing again in a recording medium after continuous imaging.

The present invention has been made in order to solve these issues and aims to provide a recording/reproducing apparatus and a recording method, which are capable of writing a large-capacity file continuously at high-speed.

DISCLOSURE OF THE INVENTION

In order to achieve this object, a recording/reproducing apparatus of the present invention has: a recording medium having different transfer rates in accordance with record positions; and control means for controlling a temporary record area to be released by writing data transferred from a host apparatus into the temporary record area with use of a predetermined record area of the recording medium as a temporary record area, and transferring the data from the temporary record area to another record area having a lower transfer rate than that of the temporary record area during an idle period.

According to the present invention, the high-speed record area of the recording medium is used as the temporary record area, data transferred from the host apparatus is written in the temporary record area, and the data is transferred from the temporary record area to the other record area having a lower transfer rate than that of the temporary record area during an idle period to release the high-speed record area and prepare for the next transfer data write. Therefore, a transfer rate as viewed from the host apparatus can be improved considerably.

The recording/reproducing apparatus of the present invention may further have a memory for storing a table for managing address information on files in the recording medium, wherein the control means may be configured to read the table in the recording medium into the memory in response to a predetermined mode switch command from the host apparatus, and checks an empty area in the temporary record area or an empty area in the other record area with reference to the table stored in the memory. More specifically, according to the present invention, a load of the host apparatus can be reduced and high-speed operation can be realized, because a process of checking the empty area in the temporary record area or the other record area is executed in the recording/reproducing apparatus by referring to the table, not depending upon the process in the host apparatus.

Further, in the recording/reproducing apparatus of the present invention, if an access request for the storage apparatus from the host apparatus does not occur after the lapse of a predetermined time or longer, the control means may control to release the temporary record area by transferring data from the temporary record area to the other record area having a lower transfer rate than that of the temporary record area. In this case, data transfer from the temporary record area to the other record area can be executed fast without contention of the process to be executed in response to an access request from the host apparatus.

Furthermore, in the recording/reproducing apparatus of the present invention, the control means may control to compress data and write the data into the temporary record area, and decompress the compressed data before the data is transferred to the other record area. It is therefore possible to improve a use efficiency of the temporary record area and suppress a capacity loss of the user area to be caused by the temporary record area when the temporary record area is used as an area unable to be observed from the user.

In addition, a recording/reproducing method according to another aspect of the present invention for recording data in a recording medium having different transfer rates in accordance with record positions, the method has steps of: writing data transferred from a host apparatus into the temporary record area with use of a predetermined record area of the recording medium as a temporary record area; and releasing the temporary record area by transferring the data from the temporary record area to another record area having a lower transfer rate than that of the temporary record area during an idle period.

According to the present invention, the high-speed record area of the recording medium is used as the temporary record area, data transferred from the host apparatus is written in the temporary record area, and the data is transferred from the temporary record area to the other record area having a lower transfer rate than that of the temporary record area during an idle period to release the high-speed record area and prepare for the next transfer data write. Therefore, a transfer rate as viewed from the host apparatus can be improved considerably.

The recording method of the present invention may further have steps of: reading a table in the recording medium into a memory of a recording/reproducing apparatus in response to a predetermined mode switch command from the host apparatus; and checking an empty area in the temporary record area or an empty area in the other record area with reference to the table stored in the memory. According to the present invention, a load of the host apparatus can be reduced and high-speed operation can be realized, because a process of checking the empty area in the temporary record area or other record area is executed in the recording/reproducing apparatus by referring to the table, not depending upon the process in the host apparatus.

Further, in the recording method of the present invention, if an access request for the storage apparatus from the host apparatus does not occur after the lapse of a predetermined time or longer, the temporary record area may be released by transferring data from the temporary record area to the other record area having a lower transfer rate than that of the temporary record area. In this case, data transfer from the temporary record area to the other record area can be executed fast without contention of the process to be executed in response to an access request from the host apparatus.

Furthermore, the recording method of the present invention may have steps of: compressing data to be written into the temporary record area; and decompressing the compressed data read from the temporary record area before the data is transferred from the temporary record area to the other record area. It is therefore possible to improve a use efficiency of the temporary record area and suppress a capacity loss of the user area to be caused by the temporary record area when the temporary record area is used as an area unable to be observed from the user.

BRIEF DESCRIPTION OF THE DRAWINGS

FIG. 4 is a diagram showing an example of a command for setting parameters for data write.

BEST MODE FOR CARRYING OUT THE INVENTION

An embodiment of the present invention will be described below with reference to the accompanying drawings.

Figure 1:
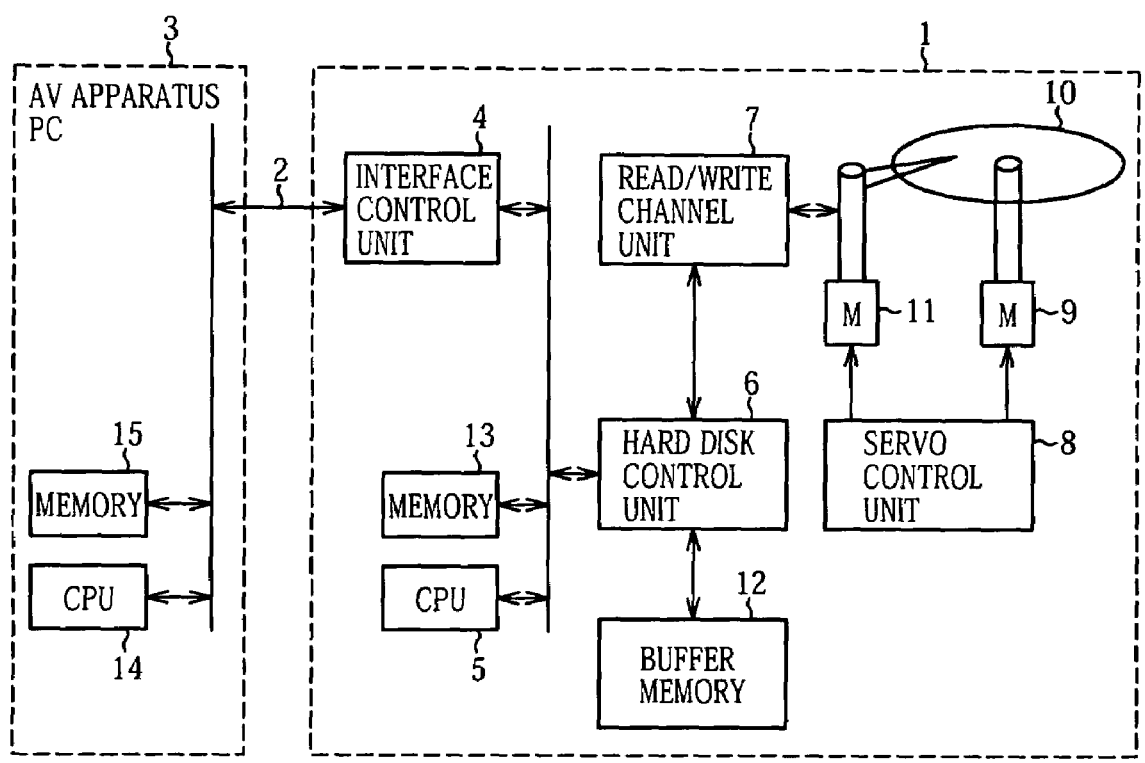
FIG. 1 is a diagram showing the structure of a recording/reproducing apparatus according to an embodiment of the present invention.

FIG. 1 is a diagram showing the structure of a recording/reproducing apparatus according to the embodiment of the present invention.

This recording/reproducing apparatus is a hard disk drive (hereinafter called "HDD") 1 using a hard disk (hereinafter called "disk") 10 and, adopts as a file system an MS-DOS compatible FAT file system.

The HDD 1 is connected to a host apparatus 3 such as an AV apparatus via an interface 2 such as IDE (Integrated Drive Electronics), SCSI (Small Computer System Interface), FC (Fibre Channel) and USB (Universal Serial Bus). An interface control unit 4 of the HDD 1 receives a command issued from the host apparatus 3 via the interface 2, comprehends its contents and notifies a CPU 5 (Central Processing Unit) in the HDD 1. In accordance with the notified contents, the CPU 5 sets commands and parameters necessary for a hard disk control unit 6, a read/write channel unit 7 and a servo control unit 8 to execute their operation.

The servo control unit 8 controls driving of a spindle motor 9 for driving and rotating the disk 10 and a voice coil motor 11 for feeding a head (not shown) for reading/writing signals from/to the disk 10 in a radial direction of the disk 10, to thereby move the head to predetermined track and sector. The read/write channel unit 7 encodes (modulates) user data sent during data write to the disk 10 into a digital bit string suitable for the characteristics of a recording/reproducing system. The read/write channel unit 7 removes high frequency noises from reproduction signals read from the head during data read, converts analog signals into digital signals, estimates data by using a maximum likelihood decoding method, and thereafter demodulates to reproduce user data.

The hard disk control unit 6 manages data transfer among a buffer memory 12, the read/write channel unit 7 and the interface control unit 4, and executes a process regarding the format of data. In this case, encoding and error detection by error correction codes and a process regarding error correction are also executed.

Figure 2:
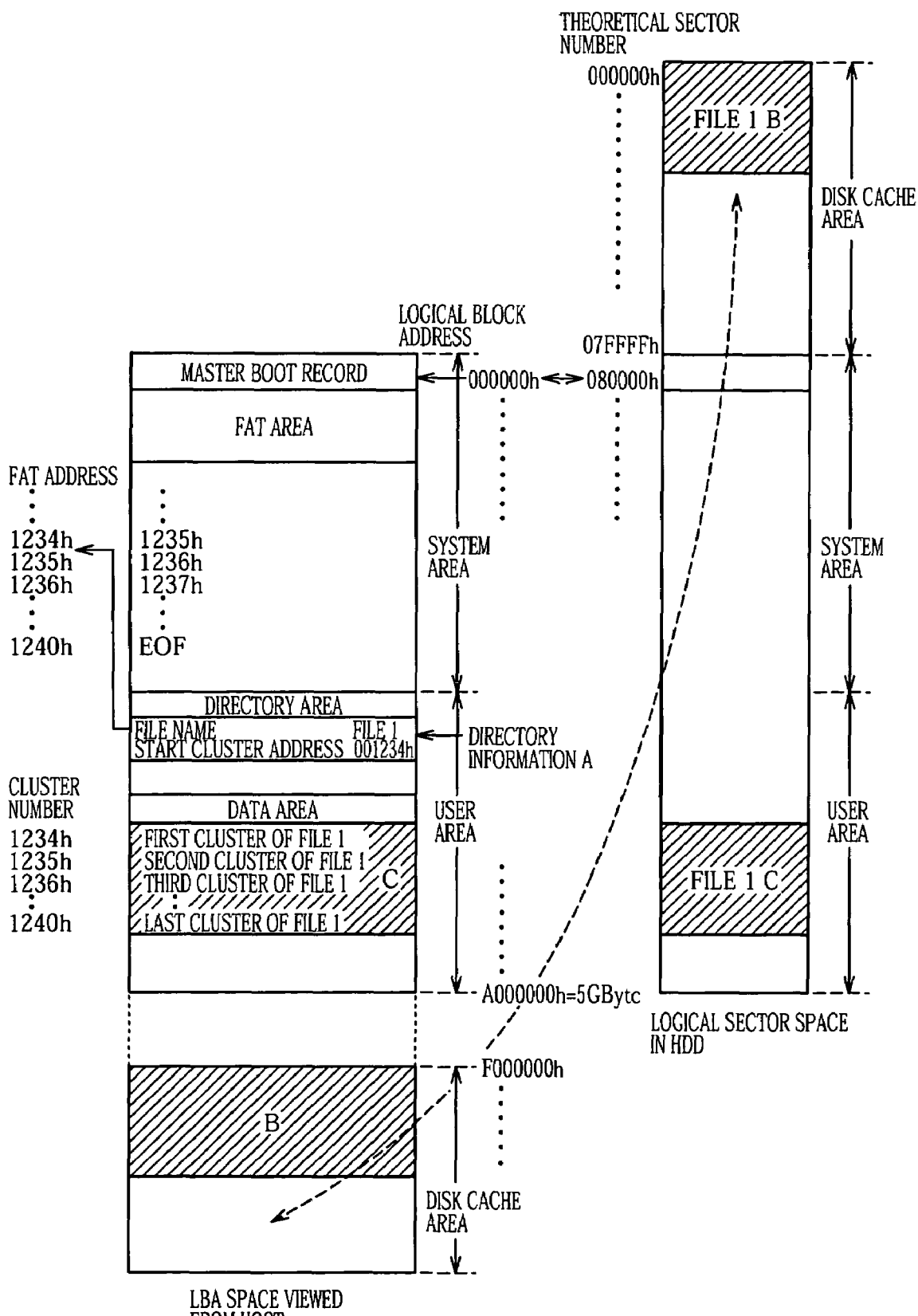
FIG. 2 is a diagram showing an area map of a disk address space of the recording/reproducing apparatus shown in FIG. 1.

FIG. 2 is a diagram showing an area map of a disk address space. A minimum unit of data write to the HDD 1 is called a sector whose size is usually 512 bytes. The HDD 1 manages a storage area of the disk 10 in the sector unit by using three parameters: a physical address, a physical sector number, a logical sector number. The physical address is constituted of three parameters: a surface number, a track number and a sector number. The physical sector number is the numbers of all sectors sequentially numbered in the order from the outer area of the disk 10 to the inner area. The logical sector number is an address assigned to a defect sector unable to read/write, by a substitution process.

On the other hand, the host apparatus 3 accesses the disk 10 by using a logical block address (LBA). The file system for managing files uses one cluster constituted of a plurality of (N) sectors as a read/write minimum unit. A FAT (File Allocation Table) is a table having information therein on how each file is stored in clusters. A file system which performs management by using FAT is called a FAT file system. In the following description, it is assumed that a cluster address is obtained by simply dividing LBA by N, where N=16 (one cluster=8 Kbyte).

The storage area of the HDD 1 is usually divided into three areas: a system area, a user area and an HDD system area. The system area and user area are allocated in an LBA space as viewed from the host apparatus 3.

The system area is constituted of two areas; a master boot record and a FAT area. The master boot record is a sector at LBA 0 as viewed from the host apparatus 3, and records a boot strap code and a partition table.

The user area is constituted of a directory area for managing file information and a data area of actual data (In FAT 32 or before, only a root directory belongs to the system area). The directory area stores, as directory information A, a file name, an extension, an attribute, a latest update time, a start cluster address, a file size and the like, respectively of each directory (each file).

The HDD system area is used for the CPU 5 in the HDD 1 to store boot codes and various tables, or for an area for the substitution process. Generally, the host apparatus does not use the HDD system area so that this area is omitted in FIG. 2.

In this embodiment, an area is set for temporarily storing data to be written. This area corresponds to an area (256 MByte) at logical sector numbers from 00000h to 7FFFF shown in FIG. 2. Therefore, the logical sector number of the master boot record is 80000h. In the following, the area for temporarily storing data to be written is called a disk address space. In the LBA space, the disk cache area is disposed in a space after F00000h which area the host apparatus 3 does not use (data area is up to 9FFFFF). A cluster address is defined also for this disk cache area.

In recent HDDs, zone bit recording is generally performed in which a disk is divided into a plurality of zones (e.g., 10 to 20 zones) and each zone uses the same write frequency and same recording/reproducing parameters (coefficients of a waveform equivalent filter, etc.). If write (read) is performed only in one zone, it is not necessary to change parameters so that an efficiency is improved. Therefore, the size of the disk cache area is determined by considering the zone size.

Figure 3:
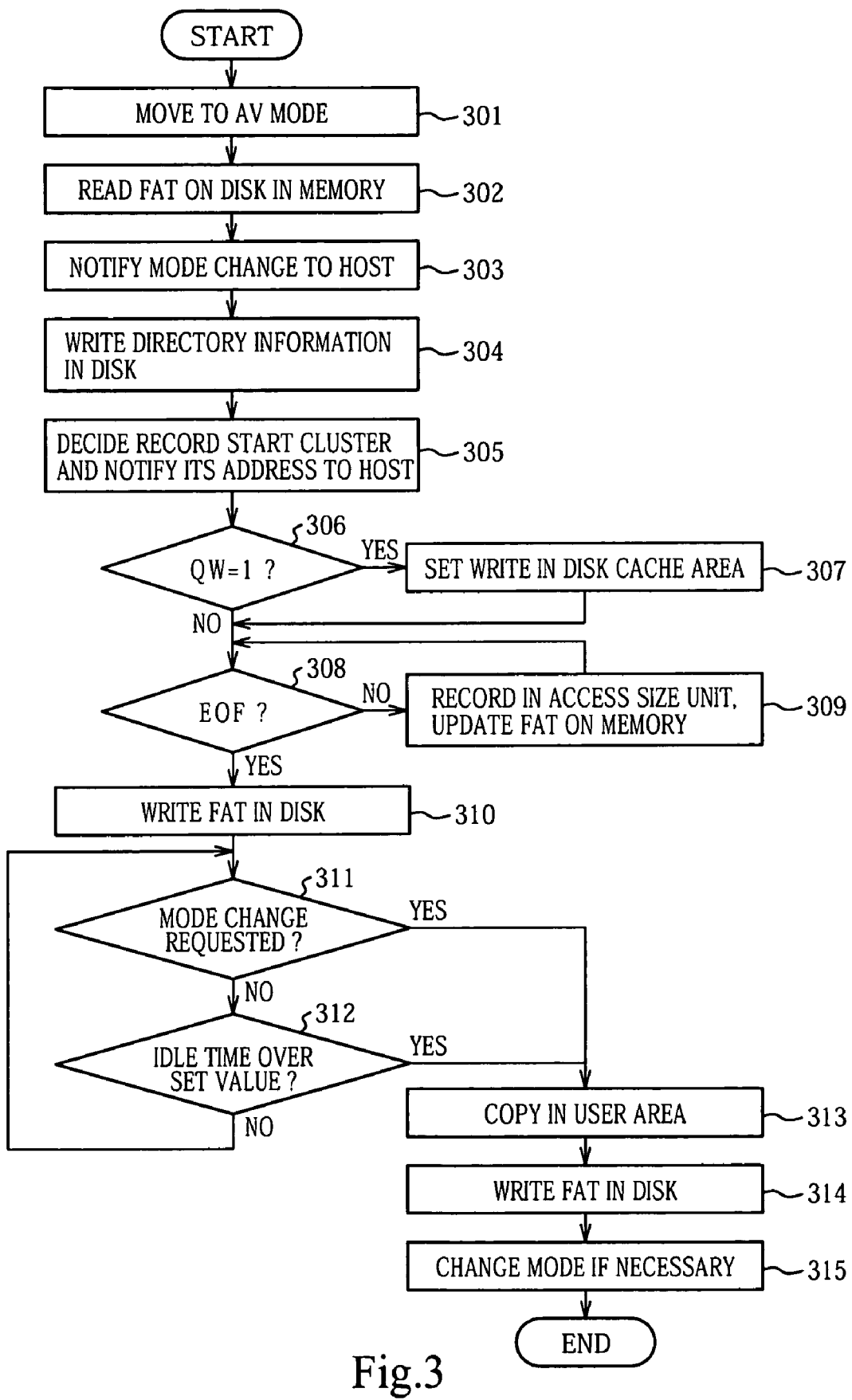
FIG. 3 is a flow chart illustrating an operation sequence of data write to HDD.

Next, with reference to FIG. 3, description will be made on an operation of data write to the HDD 1.

Data write to the HDD 1 by using the disk cache area is executed while the HDD 1 manages address information for file management. This operation mode is called an AV mode hereinafter and a normal operation mode is called a PC mode hereinafter.

First, the host apparatus 3 updates the contents of the FAT area of the disk 10 in the HDD 1 to latest contents, and thereafter issues a command of transferring to the AV mode from the PC mode. When the CPU 5 in the HDD 1 knows via the interface control unit 4 an instruction of transfer to the AV mode (Step 301), the CPU 5 loads the contents of the FAT area in the disk 10 into a memory 13 (Step 302), and sets a flag indicating an execution state of the AV mode to notify the host apparatus 3 of transfer to the AV mode (Step 303).

When a particular write request operation such as continuous imaging by a digital camera is executed in the host apparatus 3, the host apparatus 3 determines a file name (File 1) of content data to be written, newly forms directory items and writes the items in the HDD 1. The directory items written at this time are only a start cluster address and a latest update time, which are incomplete as directory items.

The HDD 1 references FAT retained in the memory 13, selects a proper cluster from empty clusters, and writes the directory information in the selected cluster (Step 304). After the directory information is written, the address is notified to the host apparatus 3.

Next, the host apparatus 3 sets parameters necessary for writing content data. Specifically, a start cluster address, access size and the like of a file are determined. Although the host apparatus 3 defers management of FAT to HDD, the start cluster address is required to be shared in order to identify the file. FIG. 4 shows an example of the command (Set Rec Parameter) for executing sharing. The command is defined as a vendor unique command of FAT, and executed only once prior to writing the file.

Of bits defined in a Feature register in the command, an OP (Outer Position) and an IP (Inner Position) designate from which of the outer side or inner side of the disk 10 the HDD 1 takes the record start cluster. If bits of both OP and IP are 0, a start cluster address set in a Sector Count register or the like becomes valid.

In order to execute data write to the HDD 1 by using the disk cache area, the host apparatus 3 notifies the HDD 1 of use permission of the disk cache area in the file unit. To this end, the command is executed by setting "1" to a QW and OP, and notifies the host apparatus 3 of a first searched empty cluster as a start cluster address (Step 305).

As the HDD 1 determines from the command issued from the host apparatus 3 that the disk cache area can be used (Steps 306 and 307), HDD searches sequentially an empty cluster in the disk cache area starting from the top of the disk cache area to select a longest continuous empty area. The HDD 1 records the start cluster address of the selected empty area together with the record start cluster address notified to the host apparatus 3. For example, in the example shown in FIG. 2, the start cluster address of the empty area is LBA F00000h (PLBA 000000). Since data in the disk cache area is copied (moved) to the user area, most of the disk cache area are in an unused (empty) state.

Thereafter, the host apparatus writes sequentially data of the file in a set access size unit (Steps 308 and 309). At this time, although data is not written in the cluster at the address notified to the host apparatus 3, a used flag (e.g., EOF) is set to FAT.

Data sent from the host apparatus 3 is once stored in the buffer memory 12, and formatted by the hard disk control unit 6, sent thereafter to the read/write channel unit 7, and written in the selected cluster (B in FIG. 2) in the disk cache area. In this case, if the CPU 5 of the HDD 1 or the hard disk control unit 6 has a sufficient ability, data is compressed to reduce a write amount to the disk 10 so that a transfer rate as viewed from the host apparatus 3 can be improved.

Each time data write of one access size unit is completed, FAT in the memory 13 is renewed by using the cluster address of the disk cache area mapped on the LBA space. In FIG. 2, the cluster at the cluster address F0000h is the start cluster, and since the data write is executed continuously thereafter, F000h is set to the FAT item at the address F0000h, F0002h is set to the FAT item as the address F0001h, and EOF (0FFFFFFFh in FAT32) is set at the last F000Dh.

After the file is completely written in the disk 10, the host apparatus 3 updates the directory items of the disk 10 as for the latest update time and start cluster address. Thereafter, the host apparatus 3 instructs the HDD 1 to write FAT in the memory 13 to the disk 10 (Step 310).

Thereafter, if write or read does not occur after the lapse of a preset time or longer (if Idle) (YES at Step 312), then the HDD 1 copies data in the disk cache area to the user area (C in FIG. 2) (Step 313). Since the start cluster address has already notified to the host apparatus 3, data write starts at this address. Thereafter, FAT in the memory 3 is referenced to sequentially search an empty cluster in the user area in accordance with designation by IP and OP, and data is written in the empty cluster immediately after the empty cluster is found.

For example, in the example shown in FIG. 2, first the cluster at an address F0000h is copied to 01234h. At this time, the FAT item at the address 01234h is set to F0001h, and the cluster at the address F0000h is set to an unused state (0000000h in FAT32). Next, since the cluster at an address 01235h is empty, the cluster at the address F0001h is copied to the empty cluster. 01235h is set to the FAT item at an address 01234h, F0002h is set to the FAT item at the address 01235h, and the unused state is set to the FAT item at the address F0001h. Similarly, clusters down to the address F000Dh are sequentially copied down to an address 01240h.

Accordingly, FAT is also updated (Step 314) to set the unused state to the clusters down to F000Dh, and EOF (0FFFFFFFh) is set to the FAT item at the cluster address 01240h at which the last portion of the file is entered.

If the data was compressed, the original data is recovered and written. If the command of transferring to the PC Mode from the AV mode is issued from the host apparatus 3 during copy, the host apparatus 3 is notified of that the process is not still completed, to thereby intercept transfer of the operation mode.

The description has been made by using HDD by way of specific example. The present invention is also applicable to storage media whose transfer rate changes in accordance with an access position, such as optical disks including a CD (Compact Disc) and DVD (Digital Versatile Disc), storage devices using semiconductor memories as a medium and the like. The types of file systems optimum in the present invention are not limited to a FAT file system, but any other file systems can also be adopted if the file systems manage data as files.

According to the recording/reproducing apparatus of the embodiment described above, data write of high-speed and large-capacity can be executed stably at a maximum transfer rate of the storage apparatus. Particularly in the case of a hard disk drive, there is a twice transfer rate difference at a maximum between each zone, and fragmentation exists in practice. Therefore, an effective write transfer rate is about one third to one fourth of the maximum value. Data write is therefore possible generally at a maximum performance. Since the transfer rate of the recording/reproducing apparatus is improved, for example, a wait time after continuous imaging by a digital camera can be shortened without providing a large buffer on the host side.

The present invention is not limited only to the above-described embodiment, but it is obvious that various modifications are possible in the range not departing from the gist of the present invention.

INDUSTRIAL APPLICABILITY

According to the recording/reproducing apparatus and recording method of the present invention, a file of large-capacity can be written continuously at high-speed, and advantageous effects can be obtained, for example, a wait time after continuous imaging by a digital camera can be shortened without providing a large buffer on the host side.

The invention claimed is:

1. A recording/reproducing apparatus, characterized by comprising:
    a recording medium having different transfer rates in accordance with record positions; and
    control means for controlling a temporary record area to be released by writing data transferred from a host apparatus into the temporary record area with use of a predetermined record area of the recording medium as the temporary record area, and transferring the data from the temporary record area to another record area having a lower transfer rate than that of the temporary record area during an idle period,
    wherein the control means reads a table in the recording medium into a memory storing the table for managing address information on a file in the recording medium in response to a switch command from the host apparatus for switching to a write mode with use of the temporary record area, checks an empty area in the temporary record area or in the another record area with reference to the table stored in the memory, and notifies a write start address of the another record area to the host apparatus.

2. The recording/reproducing apparatus according to claim 1, characterized in that
    if an access request for the storage apparatus from the host apparatus does not occur after the lapse of a predetermined time or longer, the control means controls to release the temporary record area by transferring data from the temporary record area to the other record area having a lower transfer rate than that of the temporary record area.

3. The recording/reproducing apparatus according to claim 1, characterized in that
    the control means compresses data and writes the data into the temporary record area, and decompresses the compressed data before the data is transferred to the other record area.

4. A recording method for recording data into a recording medium having different transfer rates in accordance with record positions, characterized by comprising the steps of:
    writing data transferred from a host apparatus into a temporary record area with use of a predetermined record area of the recording medium as the temporary record area;
    releasing the temporary record area by transferring the data from the temporary record area to another record area having a lower transfer rate than that of the temporary record area during an idle period;
    reading the table in the recording medium into a memory in a recording/reproducing apparatus in response to a switch command from the host apparatus for switching to a write mode with use of the temporary record area; and
    checking an empty area in the temporary record area or in the another record area with reference to the table stored in the memory.

5. The recording method according to claim 4, characterized in that:
    if an access request for the storage apparatus from the host apparatus does not occur after the lapse of a predetermined time or longer, the temporary record area is released by transferring data from the temporary record area to the another record area having a lower transfer rate than that of the temporary record area.

6. The recording method according to claim 4, characterized by further comprising the steps of:
    compressing data to be written into the temporary record area; and
    decompressing the compressed data read from the temporary record area at the time of transferring the data from the temporary record area to the another record area.

* * * * *